(12) United States Patent  
Weigel

(10) Patent No.: US 6,249,637 B1
(45) Date of Patent: Jun. 19, 2001

(54) HOLDING CONFIGURATION AND METHOD FOR PRODUCING A HOLDING CONFIGURATION FOR AT LEAST ONE SHEATHED OPTICAL FIBER CONDUCTOR

(75) Inventor: Hans-Dieter Weigel, Berlin (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/067,073

(22) Filed: Apr. 27, 1998

Related U.S. Application Data

(63) Continuation of application No. PCT/DE96/02024, filed on Oct. 18, 1996.

(30) Foreign Application Priority Data

Oct. 27, 1995 (DE) ................................. 195 41 139

(51) Int. Cl.⁷ ................................................ G02B 6/00
(52) U.S. Cl. ............................ 385/139; 385/72; 385/80; 385/138
(58) Field of Search ............................... 385/139, 60, 68, 385/72, 78, 80, 88, 137, 138

(56) References Cited

U.S. PATENT DOCUMENTS

| 4,699,462 | 10/1987 | Jones | 385/86 |
|---|---|---|---|
| 4,948,222 | 8/1990 | Corke et al. | 385/100 |
| 4,984,865 | 1/1991 | Lee et al. | 385/53 |
| 5,574,819 | 11/1996 | Gunther et al. | 385/139 |

FOREIGN PATENT DOCUMENTS

| 2711670C2 | 4/1983 | (DE) . |
|---|---|---|
| 4303737A1 | 8/1994 | (DE) . |
| 4330941C1 | 3/1995 | (DE) . |
| 2046472A | 11/1980 | (GB) . |

Primary Examiner—Rodney Bovernick
Assistant Examiner—Juliana K. Kang
(74) Attorney, Agent, or Firm—Herbert L. Lerner; Laurence A. Greenberg; Werner H. Stemer

(57) ABSTRACT

A holding configuration and a method for producing a holding configuration for at least one sheathed optical fiber conductor include a holding body having a through-channel with first and second sections and an outlet opening. The optical fiber conductor is fixed in a fixing compound in the first section and emerges from the holding body through the outlet opening with radial freedom of movement and free of fixing compound. The through-channel expands from the first section to the second section having a cross section which is dimensioned in such a way that fixing compound in the second section remains essentially free of capillary force. A rim of the outlet opening which comes into contact with the optical fiber conductor is rounded.

8 Claims, 2 Drawing Sheets

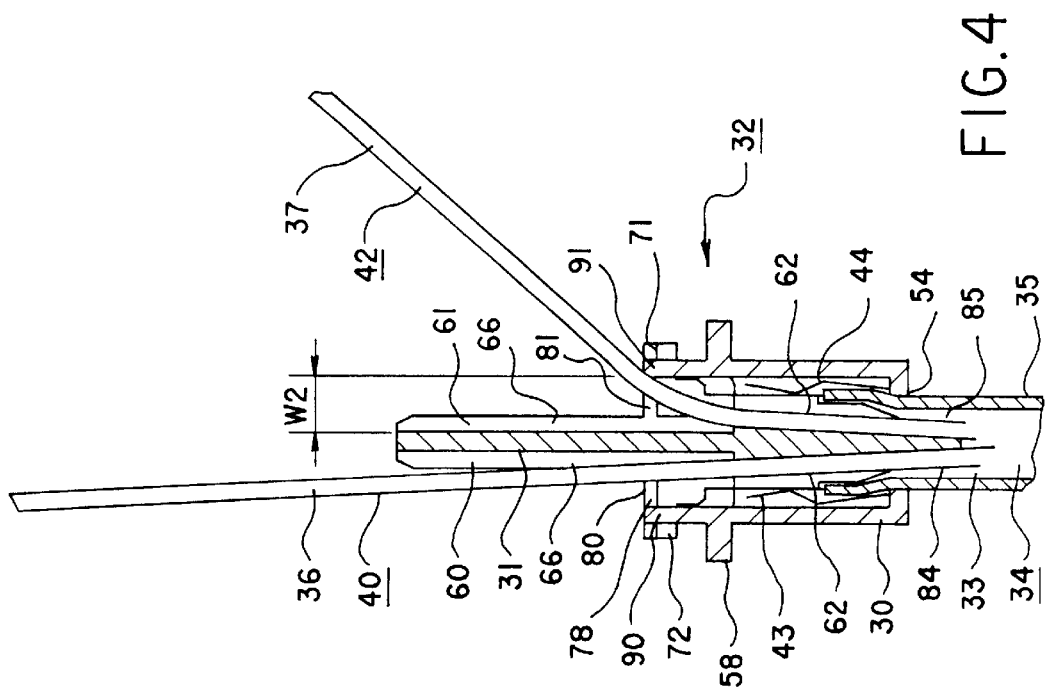
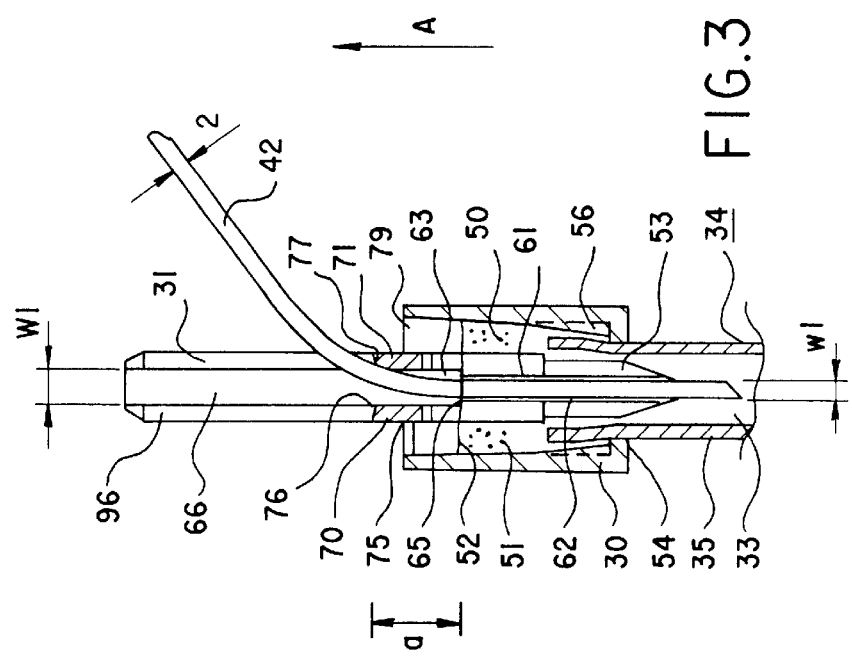

HOLDING CONFIGURATION AND METHOD FOR PRODUCING A HOLDING CONFIGURATION FOR AT LEAST ONE SHEATHED OPTICAL FIBER CONDUCTOR

CROSS-REFERENCE TO RELATED APPLICATION

This application is a continuation of International Application No. PCT/DE96/02024, filed Oct. 18, 1996, which designated the United States.

BACKGROUND OF THE INVENTION

Field of the Invention

The invention is in the field of the preparation of ends or sections of optical fiber conductors or optical cables and relates to a holding configuration including a receptacle having an inlet opening for receiving an end of an optical fiber cable which is stripped at the end revealing an optical fiber conductor and an outlet opening through which the optical fiber conductor emerges with radial freedom of movement and free of fixing compound, a spreading body at least partially inserted into the end of the cable sheath, and a fixing compound introduced into the receptacle and fixing a section of the optical fiber conductor. The invention also relates to a method for producing a holding configuration.

Such holding configurations are used, for example, for connecting an optical fiber conductor end to an electrooptical module, or for coupling to corresponding plug connectors. Holding configurations, as an end piece which can be coupled, can directly terminate the optical fiber conductor, which is sheathed by a protective sheath, or can surround a section of the optical fiber conductor located in front of the end, so that the optical fiber conductor runs on both sides of the holding configuration. In each case, the holding configuration has at least one end (which is called an outlet opening in the following text) of a through-channel for holding the optical fiber conductor, from which end the optical fiber conductor emerges.

U.S. Pat. No. 4,984,865 discloses a holding configuration for an optical fiber conductor which emerges from a cable sheath end together with ends of a strain relief device in the form of strands (aramide fibers). The cable sheath end is inserted into a plug connector housing, which is filled with a thermoplastic. It is not possible for unacceptably small bending radii of the optical fiber conductor to occur in the case of that known holding configuration, since the optical fiber conductor is completely surrounded by the thermoplastic and runs in a fixed manner within the holding part.

German Patent DE 27 11 670 C2 discloses a holding configuration in the form of a detachable plug connector, in which two optical fibers to be coupled are each bonded by their end region into a centering insert. The latter is inserted into one end of a tube, which is used as a guide body and can be inserted with the corresponding coupling partner into an adjustment capillary, in order to make contact at the end.

In the case of the holding configuration of the type mentioned initially, which is known from German Published, Non-Prosecuted Patent Application DE 43 03 737 A1, corresponding to U.S. Pat. No. 5,574,819, a cable end, which has been freed at the end of its cable sheath revealing strain relief device ends and two optical fiber conductor ends which are sheathed by one protective sheath (buffer) in each case, enters an inlet opening of a receptacle. A spreading sleeve is inserted into the cable sheath end and expands the sheath beyond the inlet opening width. The optical fiber conductors pass through a through-channel which runs from the inlet opening to an outlet opening, and leave the receptacle with radial freedom of movement. The receptacle is partially filled with a fixing compound. That surface of the cured fixing compound which is close to the outlet opening (filling level) is located vertically at a distance below the outlet opening in the longitudinal axis direction when the configuration is oriented vertically.

If the cable end, once it has been provided with the holding configuration, is handled incorrectly or carelessly in the rest of the production or assembly process, there is a risk of the optical fiber conductors being bent over the comparatively sharp-edged contact line to the surface of the fixing compound.

That problem is exacerbated if fixing compounds are used which raise up the optical fiber conductors due to adhesion effects and capillary forces. Specifically, in practice, it has been found with through-channels having a cross section which is dimensioned to be only slightly greater than the cross section of the sheathed optical fiber conductor, that the fixing compound, when in the flowing state, rises to an undesirably high extent above the desired filling level due to capillary effects, and consequently forms sharp edges which lie against the optical fiber conductor, closely underneath the outlet opening. On one hand, if optical fiber conductors are bent beyond their critical bending radii, they can be irreversibly damaged. Such damage may temporarily remain concealed by the protective sheath in a disadvantageous manner, and not be detected until final inspection or initial operation. On the other hand, comparatively narrow through-channels are desirable in order to achieve adequate adhesion forces, the necessary amount of fixing compound and its curing time.

In order to overcome that problem, production and assembly have until now had to be carried out extraordinarily carefully, with the optical fiber conductors temporarily being fixed in appropriately constructed production holders at least until additional, permanent structural elements (for example separate kink protection elements) or appropriate housings with guides were fitted.

SUMMARY OF THE INVENTION

It is accordingly an object of the invention to provide a holding configuration and a method for producing a holding configuration for at least one sheathed optical fiber conductor, which overcome the herein afore-mentioned disadvantages of the heretofore-known devices and methods of this general type and which, even immediately after fitting and curing of a fixing compound, and without any additional apparatuses, ensure reliable protection of the sheathed optical fiber conductor against unacceptably small bending radii.

With the foregoing and other objects in view there is provided, in accordance with the invention, a holding configuration, comprising a fixing compound; a receptacle for receiving the fixing compound, the receptacle having an inlet opening for receiving an end of an optical fiber cable stripped at the end to expose an optical fiber conductor, and the receptacle having an outlet opening through which the optical fiber conductor emerges with radial freedom of movement and free of the fixing compound fixing a section of the optical fiber conductor; and a spreading body at least partially inserted into an end of a cable sheath of the optical fiber cable, the spreading body bounding a through-channel expanded from a first channel section closely surrounding the optical fiber conductor to a second channel section opening into the outlet opening, the second channel section having a cross section dimensioned relative to a cross section of the optical fiber conductor for maintaining the fixing compound in the second channel section substantially free of capillary forces.

While capillary force effects on the fixing compound are achieved in the first, narrower section, in order to fix the optical fiber conductor safely while using little material, as long as the fixing compound is still a low-viscosity liquid, the deliberate expansion of the through-channel results in the capillary effects in the second section being suppressed in a defined manner. On one hand, the amount of fixing compound to be introduced can thus be considerably reduced in an advantageous manner since it is necessary to fill only a comparatively narrow gap between the optical fiber conductor and the wall of the first section. Since, on the other hand, the expansion reliably prevents the fixing compound, which can still flow, from flowing on or rising undesirably in the direction of the outlet opening, the amount of fixing compound can be dimensioned and introduced without so much care being required in particular with regard to capillary effects. The amount of fixing compound is preferably dimensioned in such a way that the optical fiber conductor remains largely free of fixing compound in the second section. In consequence, the optical fiber conductor has radial mobility even at the start of the expanded section, and that has a positive influence on the bending geometry, which is governed by the last fixing point, close to the outlet opening, of the optical fiber conductor. The expansion allows the distance between the fixing point and the outlet opening to be set as planned, and to be easily controllable.

The maximum angles or bending radii of the optical fiber conductor which occur during the production and assembly processes (without deliberate overbending) are automatically kept comparatively gentle in conjunction with rounding of the rims or edges of the outlet opening which may come into contact with the optical fiber conductor. The maximum angle which can occur on its own, without deliberate action, between the longitudinal axis of the holding configuration and the optical fiber conductor is preferably less than 45°.

In accordance with another feature of the invention, the second channel section expands to approximately twice the width of the first channel section. This provides a particularly preferred cross-sectional ratio of the channel sections.

In accordance with a further feature of the invention, the expansion from the first channel section to the second channel section is constructed like a step, which permits a specially defined control of the capillary effects according to a preferred development of the invention.

In accordance with an added feature of the invention, the spreading body has two essentially parallel webs which extend radially outward as far as the rim of the receptacle and bound the outlet opening. The spreading mandrel, in combination with the receptacle, forms an outlet opening with its webs which is specifically constructed for the optical fiber conductor and has a size and contour that can be dimensioned in order to reliably avoid bending radii less than the minimum.

As a supplementary function, the webs according to an advantageous version of the invention can interact with at least one positioning projection on the holding part side, which produces a defined position and secures the spreading body against twisting.

In accordance with still another feature of the invention, the spreading body has a shaft.

In accordance with an additional feature of the invention, the narrow channel section is formed by an axial groove in the spreading body, so that the optical fiber conductor is guided particularly exactly along the spreading body.

In accordance with yet another feature of the invention, a ratio of the diameter of the optical fiber conductor including the sheath, to the width of the second channel section and to a distance between the expansion and the outlet opening, is approximately 1:2:5. This has been found to be particularly advantageous with regard to the physical structure. In practical tests, with the sheathed optical fiber conductor having a diameter of 1 mm, it has been found to be particularly advantageous for the distance between the expansion and the outlet opening to be at least 5 mm.

With the objects of the invention in view there is also provided a method for producing a holding configuration for at least one sheathed optical fiber conductor, which comprises forming a holding body with a through-channel having a first channel section expanded over an expansion region into a second channel section opening into an outlet opening having a rounded rim; applying a fixing compound from the outlet opening into the expansion region for fixing a section of an optical fiber conductor introduced or to be fitted into the first channel section; dimensioning a width of the first channel section for exerting capillary forces on the fixing compound contributing to filling a gap between the optical fiber conductor and the first channel section, and dimensioning a width of the second channel section for maintaining the fixing compound in the second channel section free of capillary forces; and metering the fixing compound for permitting the optical fiber conductor to emerge through the outlet opening with radial freedom of movement and free of fixing compound.

Other features which are considered as characteristic for the invention are set forth in the appended claims.

Although the invention is illustrated and described herein as embodied in a holding configuration and a method for producing a holding configuration for at least one sheathed optical fiber conductor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 3 and 4 are sectional views of a holding configuration according to the invention.

DESCRIPTION OF THE PREFERRED EMBODIMENTS

Figure 1:
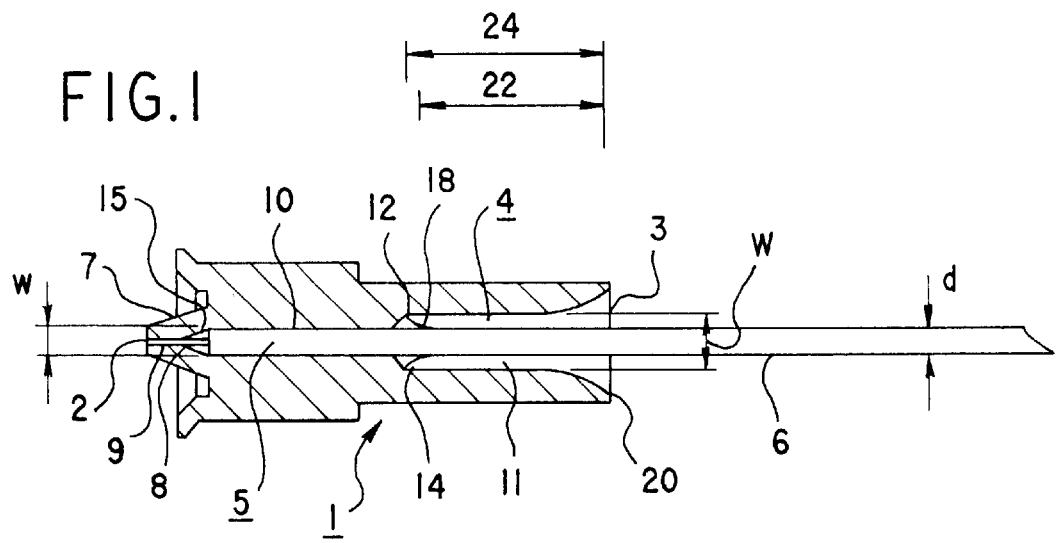
FIGS. 1 and 2 are diagrammatic, sectional views of a holding configuration produced by using the method according to the invention.
Figure 2:
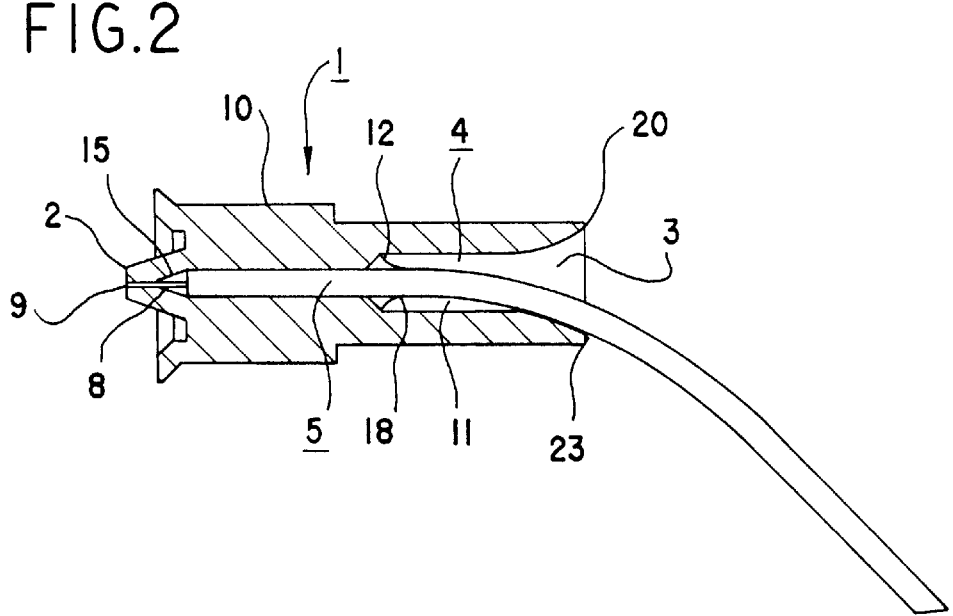

Referring now to the figures of the drawings in detail and first, particularly, to FIGS. 1 and 2 thereof, there is seen a holding or support configuration which includes a holding body 1 with an inlet opening 2 and an outlet opening 3, between which a through-channel 4 runs, in order to hold a section of an optical fiber conductor 5. The optical fiber conductor 5 includes an outer protective sheath ("buffer") 6, an inner protective sheath ("coating") 7 and an optical fiber 8 as a signal conductor, having an exposed end 9 which passes through the inlet opening 2. Depending on the application, the holding configuration may be constructed as a plug connector for coupling to corresponding plug connector parts or for flange connection to a module housing as illustrated, in which case it is possible in each case to position and fix the end 9 of the optical fiber 8 precisely with the aid of the holding configuration.

The through-channel 4 is divided into at least first and second mutually adjacent channel sections 10, 11. The first section 10 is constructed to be narrower and encloses the protective sheath 6 of the optical fiber conductor 5 except for a narrow gap, which allows the insertion of the optical fiber conductor, and assists the capillary penetration of a fixing compound 12. The second section 11 is expanded considerably in comparison. The curable potting compound or fixing compound 12 which is applied from the outlet opening 3 surrounds the end of the narrower section 10 close to the inlet opening and the region of an expansion 14, and fills a gap between the optical fiber conductor 5 and an inner wall surface of the section 10. The fixing compound 12 is preferably applied before the insertion of the optical fiber conductor, so that when the optical fiber conductor is inserted, fixing compound also passes into a front region 15 close to the inlet opening, in order to fix the inner protective sheath 7 and the optical fiber 8.

One aspect that is essential to the invention is that the through-channel 4 expands from the narrower first section 10 to the second section 11 which is close to the outlet opening. The optical fiber conductor 5 runs free of fixing compound 12 in the second section 11. No capillary forces act on the fixing compound 12 on the outlet opening side after the expansion 14 in the section 11. If need be, adhesion forces can lead to the fixing compound being drawn up slightly on the protective sheath 6 toward the outlet opening 3. The through-channel 4 preferably expands in the second section 11 to a width W which is at least approximately twice a width w of the first section 10. This reliably avoids any capillary effects in the second section 11, so that undesirable wetting and fixing of the optical fiber conductor 5 in the second section 11 are reliably prevented. The optical fiber conductor 5 thus has radial freedom of movement in the second section 11, in which case, in the event of radial movement, the optical fiber 8 is prevented from being kinked or being bent on a radius less than a minimum bending radius 23 at a contact point 18 next to the outlet opening, between the optical fiber conductor 5 or its outer protective sheath 6 and the fixing compound 12.

A rim 20 of the outlet opening 3 which comes into contact with the optical fiber conductor 5 is rounded, thus reliably preventing bending radii less than the minimum bending radius in the event of radial movement of the optical fiber conductor 5. (This consideration ignores arbitrary, deliberate bending back of the optical fiber conductor over the rim 20 toward the side having the inlet opening 2). The combination of the effects of the structure of the through-channel 4 and the rounding of the rim 20 ensure that the contact point 18, which is critical for radial mobility and the bending radii that occur, is constructed in a controlled manner, that can be predetermined, and is at a sufficient distance 22 from the outlet opening 3, on the inside of the holding body. By preventing capillary effects, the contact point 18 cannot become undesirably close to the outlet opening. The position of the contact point 18 can be adjusted by the metering of the amount of fixing compound, which can be carried out with a considerable amount of tolerance.

The ratio of the width w of the first section 10 to the width W of the second section 11 and to a distance 24 between the outlet opening 3 and the expansion 14 is preferably approximately 1:2:5.

FIGS. 3 and 4 show a holding or support configuration according to the invention for the preparation of ends of optical cables. This holding configuration includes a receptacle 30 and a spreading body 31, which complement one another to form a holding body 32. One end 33 of an optical fiber cable 34 enters the receptacle 30. The optical fiber cable has a cable sheath 35 that is removed at one end, as a result of which two optical fiber conductors 40, 42, which are each surrounded by an individual protective sheath 36, 37, and ends 43 of a strain-relief device 44 in the form of strands aramide fibers, for example, are exposed, as is seen in FIG. 4. The ends 43 and the end of the cable sheath 35 are potted in an interior 51 of the receptacle 30 with fixing compound 50, up to a filling level 52.

A spreading mandrel 53 is used to insert the spreading body 31 into the end of the cable sheath 35 until the cable sheath end is expanded beyond the width of an inlet opening 54 in the receptacle 30 and is consequently secured from being pulled out axially. Inwardly pointing ribs 56, which are raised from the base of the receptacle 30 and reduce the unobstructed width of the receptacle interior, run in the interior 51 of the receptacle 30, close to the inlet opening. The end of the cable sheath 35 is additionally supported and is secured against rotation with respect to the receptacle 30 by interacting with the spreading body 31 and the fixing compound 50. The ribs 56 also allow undisturbed potting, or fixing compound flow, as far as the inlet opening 54. The receptacle 30 has a flange attachment 58 through the use of which the holding configuration can be introduced in a manner that is known per se (German Published, Non-Prosecuted Patent Application DE 43 03 737 A1, corresponding to U.S. Pat. No. 5,574,819), and in such a way that it is protected against twisting, into a duplex connector housing, which dissipates the tensile stresses absorbed by the strain relief device 44. The receptacle 30 and the spreading body 31 are preferably composed of transparent material, which allows substances that are cured by light to be used as the fixing compound.

The spreading body 31 has continuous grooves 60, 61 at the sides, running in the axial direction A. The grooves 60, 61 interact with the receptacle 30 and the cable sheath 35 in each case to form a first section 62 of a through-channel 63 for the optical fiber conductors 40, 42. The axial grooves 60, 61 each have an expansion step 65, at which a width w1 of the section 62 (which is matched to the respective optical fiber conductor cross section) increases by approximately twice to a width W1, providing a radial boundary of a subsequent, second section 66.

The spreading body 31 for each optical fiber conductor has two essentially parallel webs 70, 71 and 72 (the web which is opposite and parallel to the web 72 cannot be seen due to the representation in the drawing). The webs extend radially outward to beyond a rim 75 of the receptacle 30. Each of those edges 76, 77, 78 of the webs which face the optical fiber conductors 40, 42 are rounded, so that the optical fiber conductors cannot be kinked at sharp edges. The rim 75, a rounded edge 79 of the receptacle 30 and the webs 70, 71, 72 together form an individual outlet opening 80, 81 for each optical fiber conductor. The axial grooves 60, 61 in the spreading body 31 interact with the cable sheath 35 to define a respective individual inlet opening 84, 85 for each optical fiber conductor.

The rim 75 of the receptacle 30 has projections 90, 91 which act as positioning projections and are constructed as an axial extension. When the spreading mandrel 31 is inserted, the positioning projections 90, 91 move between the webs (for example 70, 71) and thus position the spreading body 31 in such a way that it cannot twist. This prevents the cable sheath 35 from being torsioned, and the optical fiber conductors 40, 42 from being twisted around one another. In order to make handling easier, the spreading body 31 has a shaft 96, along which the axial grooves 60, 61 continue.

The broadening of the grooves 60 of the expansion step 65 prevents any further rise of the fixing compound 50, due to the capillary effect, in the axial direction A beyond the expansion toward the outlet openings 80, 81 since no capillary forces are exerted on the fixing compound 50 in the second section 66 of the through-channel 63 due to the presence of an adequate gap. While the capillary effect is desirable in order to penetrate the region located underneath the expansion step, for embedding the optical fiber conductors, the strain relief device and the cable sheath, the formation of fixing compound contacts with the optical fiber conductors above the expansion is deliberately prevented. A distance α between the outlet openings 80, 81 and the expansion, or the filling level 52, is preferably dimensioned to be five times the width w1. A width W2, which is illustrated in FIG. 4 for clarity and is at right angles to the width W1 shown in FIG. 3, is preferably dimensioned in a corresponding manner to the width W1.

In the case of a practical implementation with an optical fiber conductor diameter d of 1 mm, the width W1, which results from the distance between the webs 70, 71, is preferably dimensioned to be 2 mm. The width w1 is dimensioned to be approximately equal to the optical fiber conductor diameter, and is thus about 1 mm. The distance α is 5 mm.

A resin system which can be activated or cured by light is preferably used as the fixing compound. Such known resin systems (for example the resin system which can be activated by light and is known by the trademark KATIOBOND 050 from the company DELO) allow deliberate activation of the potting compound. Two-component epoxy resins can also be used as an alternative.

I claim:

1. A holding configuration, comprising:
   a fixing compound;
   a receptacle for receiving said fixing compound, said receptacle having an inlet opening for receiving an end of an optical fiber channel stripped to expose an optical fiber conductor, and said receptacle having an outlet opening through which the optical fiber conductor emerges with radial freedom of movement and free of said fixing compound fixing a section of the optical fiber conductor; and
   a spreading body at least partially inserted into an end of a channel sheath of the optical fiber channel, said spreading body defining a through-channel expanded from a first channel section closely surrounding the optical fiber conductor to a second channel section opening into said outlet opening, said second channel section having a cross section of at least twice that of a cross section of the optical fiber conductor for maintaining said fixing compound in said second channel section substantially free of capillary forces.

2. The configuration according to claim 1, wherein said second channel section has approximately twice the width of said first channel section.

3. The configuration according to claim 1, including a step-shaped expansion from said first channel section to said second channel section.

4. The configuration according to claim 1, wherein said spreading body has a shaft.

5. The configuration according to claim 1, wherein said spreading body has an axial groove formed therein bounding said first channel section.

6. A holding configuration, comprising:
   a fixing compound;
   a receptacle for receiving said fixing compound, said receptacle having an inlet opening for receiving an end of an optical fiber channel stripped to expose an optical fiber conductor, and said receptacle having an outlet opening with a rim through which the optical fiber conductor emerges with radial freedom of movement and free of said fixing compound fixing a section of the optical fiber conductor; and
   a spreading body at least partially inserted into an end of a channel sheath of the optical fiber channel, said spreading body defining a through-channel expanded from a first channel section closely surrounding the optical fiber conductor to a second channel section opening into said outlet opening, said second channel section having a cross section dimensioned relative to a cross section of the optical fiber conductor for maintaining said fixing compound in said second channel section substantially free of capillary forces, and said spreading body having two substantially parallel webs extending radially outward as far as said rim and bounding said outlet opening.

7. The configuration according to claim 6, wherein said receptacle has at least one positioning projection interacting with said webs.

8. A holding configuration, comprising:
   a fixing compound;
   a receptacle for receiving said fixing compound, said receptacle having an inlet opening for receiving an end of an optical fiber channel stripped to expose an optical fiber conductor, and said receptacle having an outlet opening through which the optical fiber conductor emerges with radial freedom of movement and free of said fixing compound fixing a section of the optical fiber conductor; and
   a spreading body at least partially inserted into an end of a channel sheath of the optical fiber channel, said spreading body defining a through-channel expanded from a first channel section closely surrounding the optical fiber conductor to a second channel section opening into said outlet opening, said second channel section having a cross section dimensioned relative to a cross section of the optical fiber conductor such that a ratio of the diameter of the optical fiber conductor including the sheath, to the width of said second channel section, to a distance between said expansion and said outlet opening, is approximately 1:2:5 for maintaining said fixing compound in said second channel section substantially free of capillary forces.

* * * * *